US005264701A

United States Patent [19]

Crain

[11] Patent Number: 5,264,701

[45] Date of Patent: Nov. 23, 1993

[54] ION CHAMBER FOR X-RAY DETECTION

[75] Inventor: Michael M. Crain, Waukesha, Wis.

[73] Assignee: General Electric Company, Milwaukee, Wis.

[21] Appl. No.: 857,879

[22] Filed: Mar. 26, 1992

[51] Int. Cl.[5] .............................................. G01T 1/185

[52] U.S. Cl. .................................. 250/374; 250/385.1

[58] Field of Search ................ 250/374, 385.1; 378/97

[56] References Cited

U.S. PATENT DOCUMENTS 4,230,944 10/1980 Wiegman et al. ................ 250/385.1

*Primary Examiner*—Carolyn E. Fields

*Attorney, Agent, or Firm*—Quarles & Brady

[57] ABSTRACT

A simplified ion chamber for determining radiation from an X-ray source with the chamber having a single emitter electrode and a collector electrode of substantially the same size. A spacer element for positioning between the emitter and the collector electrodes is composed of a molded cellular plastic sheet with open areas molded in the sheet for alignment with ion collecting areas of the collector electrode and the open areas being formed with tapered walls. The spacer element also has pathways formed by higher density areas corresponding to conductive pathways of the collector electrode.

6 Claims, 2 Drawing Sheets

ION CHAMBER FOR X-RAY DETECTION

BACKGROUND OF THE INVENTION

This invention relates to an ion chamber for detecting the quantity of radiation transmitted to X-ray film. More particularly, it relates to a simplified ion chamber for X-ray detection which is composed of few components and can be produced at reduced cost.

There are currently available ion chambers for X-ray detection which employ double emitters. Such an ion chamber is disclosed in U. S. Pat. No. 4,230,944. There are also available ion chambers with a single emitter. However, these require the use of additional components and hand cutting of parts. These ion chambers do not compensate for changes in the thickness of the part resulting in artifacts and X-ray attenuation due to sharp edges. Collection area contact is also not eliminated increasing the risk of electrical leakage.

The improved ion chamber of this invention greatly reduces artifacts by the elimination of density compensating "patches" employed in the prior art units where portions of the spacer have been removed such as to provide an open pathway for the conductive paths on the collector electrode. Further, separate photoelectron barriers and sharp changes in attenuation at the chamber collection volume edge are also substantially reduced.

SUMMARY OF THE INVENTION

The foregoing disadvantages of the prior art are overcome by the improved ion chamber of this invention for determining radiation from an X-ray source which includes an emitter electrode of a predetermined size and a collector electrode of substantially the same size as the emitter electrode. The collector electrode has ion collecting areas and conductive pathways. There is a spacer element positioned between the emitter and collector electrodes which is molded from a cellular plastic material with a given density. The spacer element is formed with open areas for alignment with the ion collecting areas of the collector electrode and are formed with tapered walls. The spacer element has higher density areas corresponding to the conductive pathways of the collector electrode.

In a preferred manner, the higher density areas in the spacer element are formed by compressing the cellular plastic.

In another preferred embodiment, the open areas and the tapered walls of the spacer element are formed by a molding procedure.

In one aspect, the cellular plastic material is polystyrene with a density in the range of 1.45 to 1.65 lb/ft$^3$ and is about 0.290 inch in thickness.

In one aspect there is a unique spacer element which is easily molded with the previously described features.

It is, therefore, an object of the present invention to provide a simplified ion chamber for determining radiation from an X-ray source.

It is another object of the present invention to provide an ion chamber of the foregoing type at low cost and with few components.

It is yet another object of the invention to provide an ion chamber of the foregoing type which reduces artifacts and changes in attenuation.

It is still another object of the invention to provide a spacer element for an ion chamber of the foregoing type which eliminates the need for additional components which are normally employed to compensate for different densities of materials.

The foregoing and other objects and advantages of the invention will appear from the following description. In the description, reference is made to the accompanying drawing which forms a part thereof, and in which there is shown by way of illustration preferred embodiments of the invention. Such embodiments do not necessarily represent the full scope of the invention, however, and reference is therefore made to the claims herein for interpreting the scope of the invention.

BRIEF DESCRIPTION OF THE DRAWINGS

A better understanding of the present ion chamber will be had by reference to the drawing wherein.

DESCRIPTION OF THE EMBODIMENTS

Proceeding to a detailed description of the present invention, the ion chamber generally 10 is shown in conjunction with a standard film holder 12. X-rays are indicated by the arrows 14 and a patient is shown at 16. As is well known, the ion chamber 10 is employed to monitor the amount of radiation delivered to the X-ray film in the holder 12.

Figure 4:
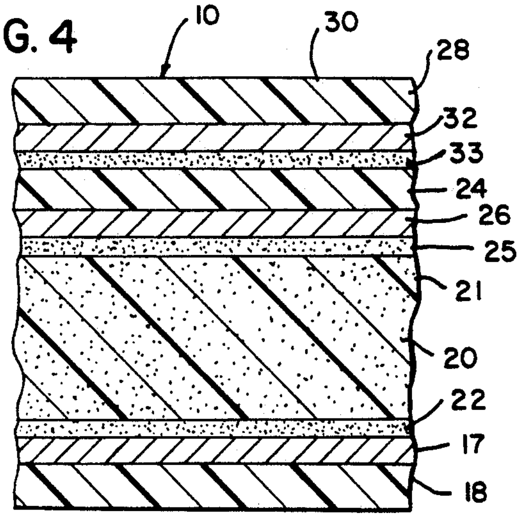
FIG. 4 is a sectional view taken on line 4—4 of FIG. 2.
Figure 2:
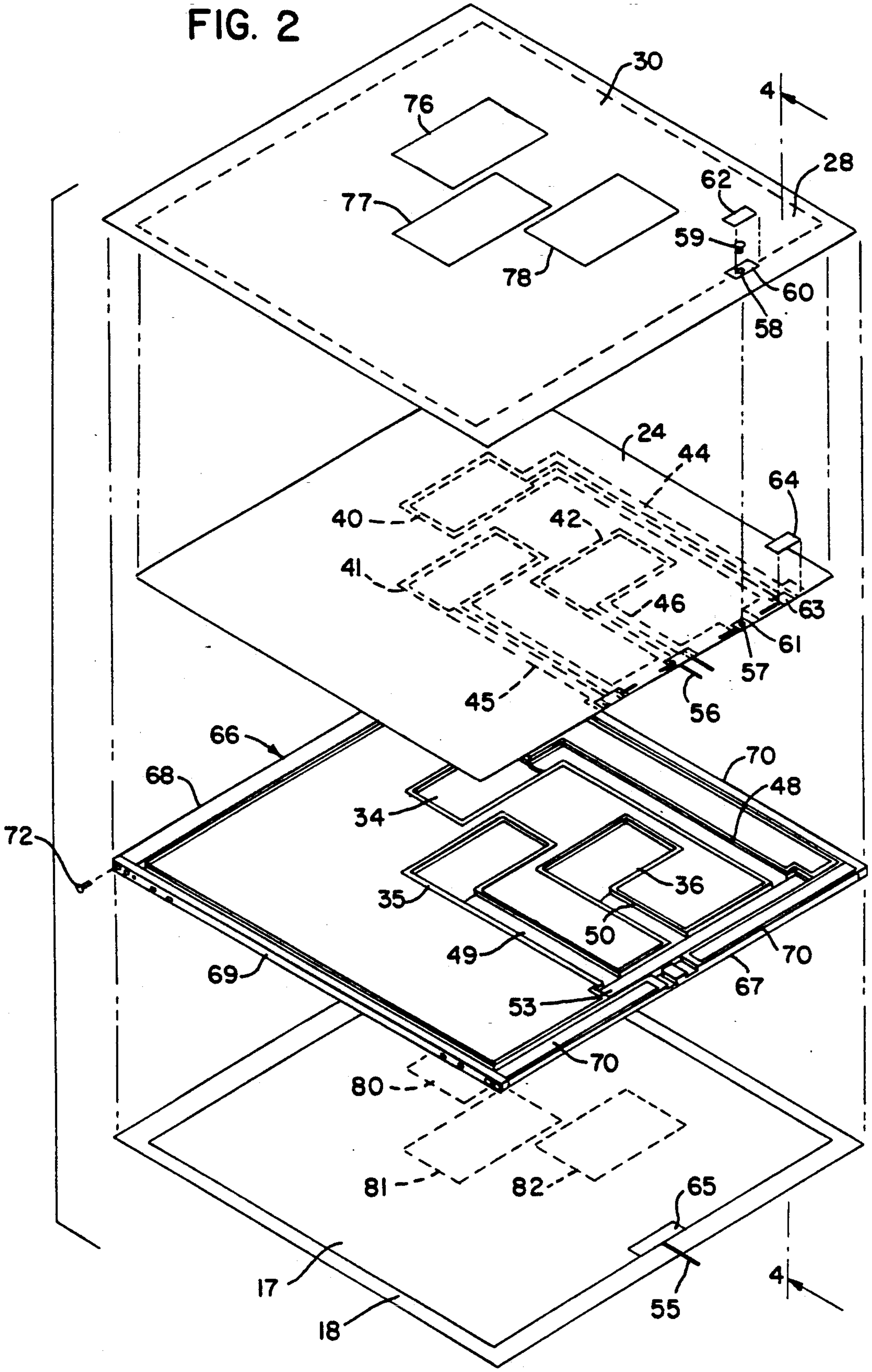
FIG. 2 is an assembly view of the ion chamber.

As seen in FIGS. 2 and 4, the ion chamber 10 includes an emitter electrode 18 having the usual metal surface 17 which preferably is lead and is secured to a spacer element 20 by an adhesive layer 22. Secured to the opposite side of the spacer element 20 by adhesive layer 25 is a collector electrode 24 having the usual conductive traces 26 which are preferably graphite. These conductive traces provide the collector fields 40, 41 and 42 and conductive pathways 44, 45 and 46 as later explained. Positioned over collector electrode 24 is a shield 28 composed of a layer of polyester sheet material 30 and a layer of aluminum 32 which in turn is secured to collector electrode 24 by adhesive layer 33.

Figure 1:
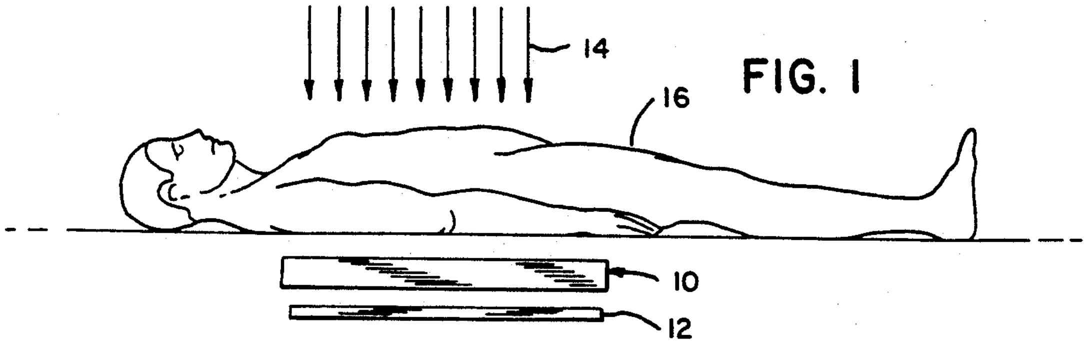
FIG. 1 is a diagrammatic view illustrating the ion chamber with a patient and an X-ray source.
Figure 3:
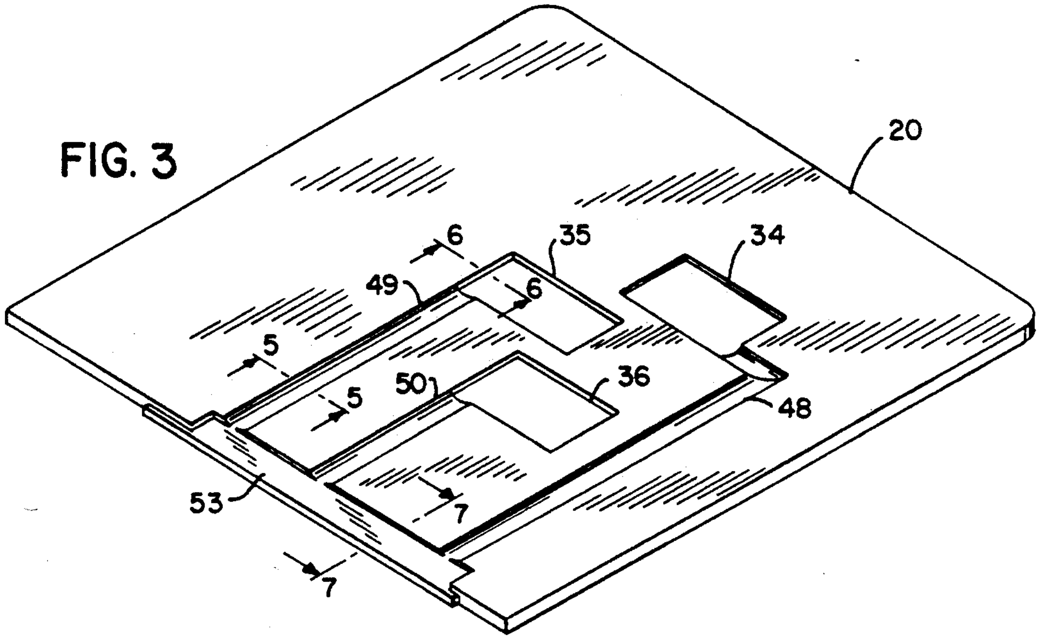
FIG. 3 is a top plan view of a spacer element for use in the ion chamber.

Referring to FIG. 3, the novel spacer 20 is illustrated. It is composed of a single sheet 21 of molded polystyrene which preferably has a density in the range of 1.45–1.65 lb/ft$^3$ and a thickness of 0.290 inch. Spacer 20 has the usual three rectangular pockets or "windows" 34, 35 and 36. These pockets are placed over the three respective collector fields 40, 41 and 42 of the collector electrode 24. Unlike prior art spacers, these pockets 34–36 are not cut from a sheet of material forming the spacer but are molded therein during the molding process. In the usual known manner, the pockets 34–36 form air chambers in which the air is ionized when the X-rays 14 are directed through the ion chamber 10 as indicated in FIG. 1 and voltages are applied to the collector fields 40, 41 and 42.

Figure 5:
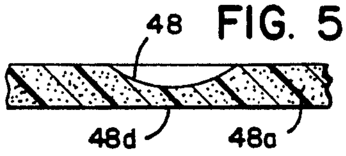
FIG. 5 is a sectional view taken on line 5—5 of FIG. 3.
Figure 6:
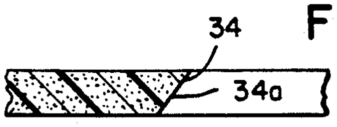
FIG. 6 is a sectional view taken on line 6—6 of FIG. 3.

In order to obviate attenuation of the X-rays 14 as they pass through the ion chamber 10, the pockets 34–36 are formed with tapered edges such as illustrated at 34a for pocket 34 as shown in FIG. 6. It should be pointed out that the wider portion of the taper 34a will face in the direction of the emitter electrode 18 so as to expose more emitter surface. Another critical area for artifact reduction are the portions of the spacer 20 which are placed over the conductive pathways 44, 45 and 46. It is much preferred that the spacer 20 not contact these pathways. In prior art devices, this is accomplished by cutting out the portions of the spacer 20 which are immediately adjacent the pathways 44, 45 and 46 and applying strips of a thin denser plastic material over these areas such as gluing them to the emitter electrode 18. However, this practice results in the previously mentioned undesired artifacts. This is obviated in the spacer 20 by providing the U-shaped channels 48, 49 and 50. These channels 48–50 are formed by compressing the molded polystyrene into this configuration while the spacer 20 is being formed in a mold. This results in the polystyrene having a higher density in the area designated as 48d than in the area designated as 48a which is seen in FIG. 5. This higher density area 48d compensates for the reduction in total thickness of material while in effect presenting the same mass of material to the X-rays 14.

Figure 7:
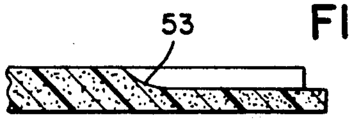
FIG. 7 is a sectional view taken on line 7—7 of FIG. 3.

As seen in FIG. 7, there is an additional compressed portion 53 which affords a compartment to accommodate the usual electrical connections for the emitter electrode 18 and the collector electrode 24.

Referring to FIG. 2, the electrical contacts for the emitter electrode 18 and the collector electrode 24 are shown at 55 and 56, respectively. In the instance of contact 55, a common 300 d.c. volt charge will be applied, and in the instance of contacts 56, they are connected to the usual preamp circuitry. The assembly of the ion chamber 10 is also shown in FIG. 2 and is the standard procedure for assembling an ion chamber of this type. Accordingly, a detailed description is not seen as necessary and a general description follows. The rivet 59 provides electrical ground connection by passing through the opening 58 of the plate 60 as well as opening 61 of the plate 57. A piece of insulating tape 62 is applied over the rivet 59 and as well over the electrical connection pads 63 such as indicated at 64. Similarly, a piece of metal foil tape 65 with conductive adhesive provides connection to the metal emitter surface 17.

As indicated with respect to FIG. 2, spacer 20 is attached to emitter electrode 18 as well as to collector electrode 24 by the adhesive layers 22 and 25. The emitter electrode 18, the spacer 20, the shield 28 and the collector electrode 24 are enclosed in a metal frame generally 66 provided by the end pieces 67, 68 and the lateral pieces 69, which are interconnected by the screws such as shown at 72. Double backed adhesive tape pieces 70 provide connection between frame end piece 67 and collector electrode 24 as well as emitter electrode 18. A hot melt adhesive is preferably applied between the frame pieces and the shield 28 and emitter electrode 18.

Reference blocks 76, 77 and 78 on shield 28 and reference blocks 80, 81 and 82 on emitter electrode 18 afford an orientation means with respect to the patient 16 and the film holder 12.

The important features of this invention are the fact that the spacer 20 is molded with the tapered walled pockets 34–36 and the compressed channels 48–50. This serves a two fold purpose in that previously used patches and barriers are eliminated as well as sharp edges on the pockets 34–36 and channels 48–50 thus reducing artifacts and attenuations. These features are accomplished at a cost savings in that extra parts are eliminated as well as the labor involved in assembling them.

While the spacer 20 has been illustrated for use in conjunction with a single emitter and collector electrode, it could be advantageously used in an ion chamber employing two or more emitters. Neither is it necessary that the pockets 34–36 be of a rectangular configuration as they can be of various shapes or sizes to match the collector fields. The same is true with respect to the configuration of the ion chamber 10. It can be of various geometric configurations such as square, rectangular or round and held in various types of frame structures.

Further, while a specific density and thickness has been stated for the spacer 20, these factors are not critical and can vary as long as the previously stated important molding features are accomplished. Polystyrene was stated as the preferred material for molding spacer 20. However, other low density, high electrical resistive materials could be used such as a foamed polypropylene or acrylic plastic.

I claim:

1. An improved ion chamber for determining radiation from an X-ray source comprising:

an emitter electrode of a predetermined size;

a collector electrode of substantially the same size as said emitter electrode, said collector electrode having ion collecting areas and conductive pathways; and a spacer element positioned between said emitter and collector electrodes, said spacer element being molded from a cellular plastic material with a given density and formed with open areas for alignment with said ion collecting areas of said collector electrode, said open areas being formed with tapered walls, and higher density areas corresponding to the conductive pathways of said collector electrode.

2. The ion chamber of claim 1 wherein said higher density areas in said spacer element are formed by compressing said cellular plastic.

3. The ion chamber of claim 1 wherein said open areas and said tapered walls are formed by a molding procedure.

4. The ion chamber of claim 1 wherein said cellular plastic material is polystyrene.

5. The ion chamber of claim 1 wherein said cellular plastic material has a density in the range of 1.45 to 1.65 $lb/ft^3$.

6. The ion chamber of claim 1 wherein said spacer element is about 0.290 inch in thickness.

* * * * *